United States Patent
Yang et al.

(10) Patent No.: US 7,256,394 B2
(45) Date of Patent: Aug. 14, 2007

(54) TARGET SUPPORT AND METHOD

(75) Inventors: Dan-Hui Dorothy Yang, Sunnyvale, CA (US); Jennifer Lu, Sunnyvale, CA (US); Ying-Lan Chang, Cupertino, CA (US); Timothy H. Joyce, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 10/949,275

(22) Filed: Sep. 24, 2004

(65) Prior Publication Data

US 2006/0065827 A1    Mar. 30, 2006

(51) Int. Cl.
*H01J 49/16*    (2006.01)
(52) U.S. Cl. ............... 250/288; 250/423 P; 250/423 R
(58) Field of Classification Search ............... 250/288
See application file for complete search history.

(56) References Cited

U.S. PATENT DOCUMENTS

2004/0209782 A1* 10/2004 Zhang et al. ............... 508/113

OTHER PUBLICATIONS

Xu et al. "Carbon Nanotubes as Assisted Matrix for Laser Desorption/Ionization Time-of-Flight Mass Spectrometry", Anal. Chemistry, vol. 75, No. 22, Nov. 15, 2003, pp. 6191-6195.*

Lustig et al., Title: "Lithographically Cut Single-Walled Carbon Nanotubes: Controlling Length Distribution And Introducing End-Group Functionality", Nano Letters, 2003, vol. 3, No. 8, pp. 1007-1012.
Bradley et al., Title: "Charge Transfer From Adsorbed Proteins", Nano Letters, 2004, vol. 4, No. 2, pp. 253-256.
Melosh et al., Title: "Ultrahigh-Density Nanowire Lattices And Circuits", Science, 2003, vol. 300, pp. 112-115.
Huang et al., Title: "Growth Of Large Periodic Arrays Of Carbon Nanotubes", Applied Physics Letters, 2003, vol. 82, pp. 460-462.
Ericson et al., Title: "Single-Wall Carbon Nanotube Films", Chem. Mater, 2003, vol. 15, pp. 175-178.
Chen et al., Title: "Noncovalent Sidewall Functionalization Of Single-Walled Carbon Nanotubes For Protein Immobilization", J.Am. Chem. Soc., 2001, vol. 123, pp. 3838-3839.
Dai, Title: "Carbon Nanotubes: Synthesis, Integration, And Properties", Acc. Chem. Res., 2002, vol. 35, pp. 1035-1044.

* cited by examiner

*Primary Examiner*—Nikita Wells
*Assistant Examiner*—Jamesw J Leybourne (57)    ABSTRACT

The invention provides an apparatus that produces analyte ions for detection by a detector. The apparatus includes a matrix based ion source having a target substrate including a carbon nanotube material for producing analyte ions, an ion transport system adjacent to the matrix based ion source for transporting analyte ions from the matrix based ion source; and an ion detector downstream from the ion transport system for detecting the analyte ions. The invention also provides a method for producing and detecting the analyte ions.

41 Claims, 11 Drawing Sheets

TARGET SUPPORT AND METHOD

TECHNICAL FIELD

The invention relates generally to the field of mass spectrometry and more particularly toward supports for improved ionization and production of analyte ions. In particular, the invention relates to ionization techniques such as atmospheric pressure matrix assisted laser desorption (AP-MALDI) and matrix assisted laser desorption (MALDI).

BACKGROUND

Most complex biological and chemical targets require the application of complementary multidimensional analysis tools and methods to compensate for target and matrix interferences. Correct analysis and separation is important to obtain reliable quantitative and qualitative information about a target. In this regards, mass spectrometers have been used extensively as detectors for various separation methods. However, until recently most spectral methods provided fragmentation patterns that were too complicated for quick and efficient analysis. The introduction of atmospheric pressure ionization (API) and matrix assisted laser desorption ionization (MALDI) have improved results substantially. These methods significantly reduce fragmentation patterns and provide high sensitivity for determining the identity of a variety of compounds. Matrix based ionization techniques have been particularly effective regarding peptides, proteins, carbohydrates, oligosaccharides, natural products, cationic drugs, cyclic glucans, taxol, taxol derivatives, metalloproteins, porphyrins, kerogens, polymers and other biological and non-biological compounds.

Accordingly, in the MALDI or AP-MALDI ionization method, the analyte and matrix in solution is applied to a probe or target substrate. As the solvent evaporates, the analyte and matrix co-precipitate out of solution to form a crystal of the analyte in the matrix on the target substrate. The co-precipitate is then irradiated with a short laser pulse inducing the accumulation of a large amount of energy in the co-precipitate through electronic excitation or molecular vibration of matrix molecules. The matrix dissipates the energy by desorption, carrying the analyte into the gaseous phase. During this desorption process, ions are formed by charge transfer between the photo-excited matrix and analyte although the mechanism of the process is not well known.

MALDI ionization is typically performed using a time-of-flight analyzer. Other mass analyzers such as an ion trap, an ion cyclotron resonance mass spectrometer and quadrupole time-of-flight are also used. These spectrometers have a number of problems because they are required to operate under high vacuum. For instance, they limit target throughput, reduce resolution, capture efficiency and make testing targets more difficult and expensive to perform.

To overcome the disadvantages described above, another technique call AP-MALDI has been developed. This technique performs similar ionizations, but at atmospheric pressure. The MALDI and AP-MALDI ionization techniques have much in common. These techniques are based on the process of a pulsed laser beam desorption/ionization of a solid-state target material resulting in production of gas phase analtye molecular ions. The ion plume is produced as a result of ionization from a solid support or plate.

A number of techniques and components have been designed to try to improve the sensitivity of these instruments. For instance, heat or heated gas flow has been introduced into the chamber or ionization region to improve the ionization process. In addition, different type plates have been developed to improve ionization. For instance, various materials have been employed to increase the hydrophobicity of the materials used on the plate surface. Improvements of the surface or surface composition have been useful in improving the overall efficiency of ion plume and ion production. This improves overall instrument performance and signal to noise ratio. For some time improvements in materials and their hydrophobicity have been problematic. These limitations and others have been obviated by the present invention.

SUMMARY OF THE INVENTION

The invention provides a mass spectrometer system comprising an ion source for producing ions, a surface for holding a sample, the surface comprising a carbon nanotube material, a laser for ionizing the sample on the carbon nanotube surface, and a detector downstream from the ion source for detecting ions of the sample. The invention also provides an ion source for use in ionizing a sample, comprising a laser; and a surface for holding the sample, the surface comprising a carbon nanotube material.

The invention provides a method for producing analyte ions for detection by a mass spectrometer. The method comprises concentrating analyte on a target substrate surface comprising a carbon nanotube material, desorbing and ionizing the analyte to form analyte ions, and detecting the analyte ions with a detector.

BRIEF DESCRIPTION OF THE FIGURES

The invention is described below with reference to the following figures.

DETAILED DESCRIPTION OF THE INVENTION

Before describing the invention in detail, it must be noted that as used in this specification and the appended claims, the singular forms, "a", "an", and "the" include plural referents unless the context clearly dictates otherwise. Thus, for example, reference, to "a MALDI plate" include more than one "MALDI plate". Reference to a "matrix" includes more than one "matrix" or a mixture of "matrixes". In describing and claiming the present invention, the following terminology will be used in accordance with the definitions set out below.

The term "adjacent" means, near, next to or adjoining. Something adjacent may also be in contact with another component, surround the other component, be spaced from the other component or contain a portion of the other component. For instance, a carbon nanotube that is adjacent to a surface or plate, may be next to the surface or plate, on the surface or plate, embedded in the surface or plate, fixed to the surface or plate, contact the surface or plate, surround the surface or plate, comprise a portion of the surface or plate.

The term "enhance" refers to any physical stimulus such as heat, energy, light, or temperature change, etc. that makes a substance more easily characterized or identified. For example, a carbon nanotube may be applied to a surface or a plate to "enhance" the production of ions. The ions increase their kinetic energy, potentials or motions and are de-clustered or vaporized. Ions in this state are more easily detected by a mass analyzer. It should be noted that when the ions are "enhanced", the number of ions detected is enhanced since a higher number of analyte ions are sampled.

The term "ion source" or "source" refers to any source that produces analyte ions. Ion sources may comprise other sources besides AP-MALDI ion sources such as electron impact (herein referred to as EI), chemical ionization (CI) and other ion sources known in the art.

The term "matrix based" or "matrix based ion source" refers to an ion source or mass spectrometer that does not require the use of a drying gas, curtain gas, or desolvation step. For instance, some systems require the use of such gases to remove solvent or cosolvent that is mixed with the analyte. These systems often use volatile liquids to help form smaller droplets. The above term applies to both nonvolatile liquids and solid materials in which the sample is dissolved. The term includes the use of a cosolvent. Cosolvents may be volatile or non-volatile, but must render the final matrix material capable of evaporating in vacuum. Such materials would include, and not be limited to m-nitrobenzyl alcohol (NBA), glycerol, triethanolamine (TEA), 2,4-dipentylphenol, 1,5-dithiothrietol/dierythritol (magic bullet), 2-nitrophenyl octyl ether (NPOE), thioglycerol, niconinic acid, cinnamic acid, 2,5-dihydroxy benzoic acid (DHB), 3,5-dimethoxy-4-hydroxycinnamic acid (sinpinic acid), a-cyano-4-hydroxycinnamic acid (CCA), 3-methoxy-4-hydroxycinnamic acid (ferulic acid), monothioglycerol, carbowax, 2-(4-hydroxyphenylazo)benzoic acid (HABA), 3,4-dihydroxycinnamic acid (caffeic acid), 2-amino-4-methyl-5-nitropyridine and their cosolvents and derivatives. In particular, the term refers to MALDI, AP-MALDI, fast atom/ion bombardment (FAB) and other similar systems that do not require a volatile solvent and may be operated above, at and below atmospheric pressure.

The term "detector" refers to any device, apparatus, machine, component, or system that can detect an ion. Detectors may or may not include hardware or software. In a mass spectrometer the common detector includes and/or is coupled to a mass analyzer.

The term "structured" refers to the positioning of carbon nanotube components in any defined or orderly arrangement that is not random. For instance, the carbon nanotubes may be stacked in a defined fashion, layered, or positioned so as to define a particular structure. In addition, they may be grown or created to form various arrays, or ordered structures that are parallel, perpendicular or other arrangements that stack in one, two or three dimensions.

The term "surface modified" refers to modifying any surface with a carbon nanotube material. This requires more than simple application or layering on the surface. For instance, surface modification may comprise attachment to the surface by van deer waals forces, ionic bonds, covalent bonds, hydrogen bonding, or any other chemical bonding or methods. The modifications may or may not be permanent and in some cases may be reversible.

The invention is described with reference to the figures. The figures are not to scale, and in particular, certain dimensions may be exaggerated for clarity of presentation.

Figure 1:
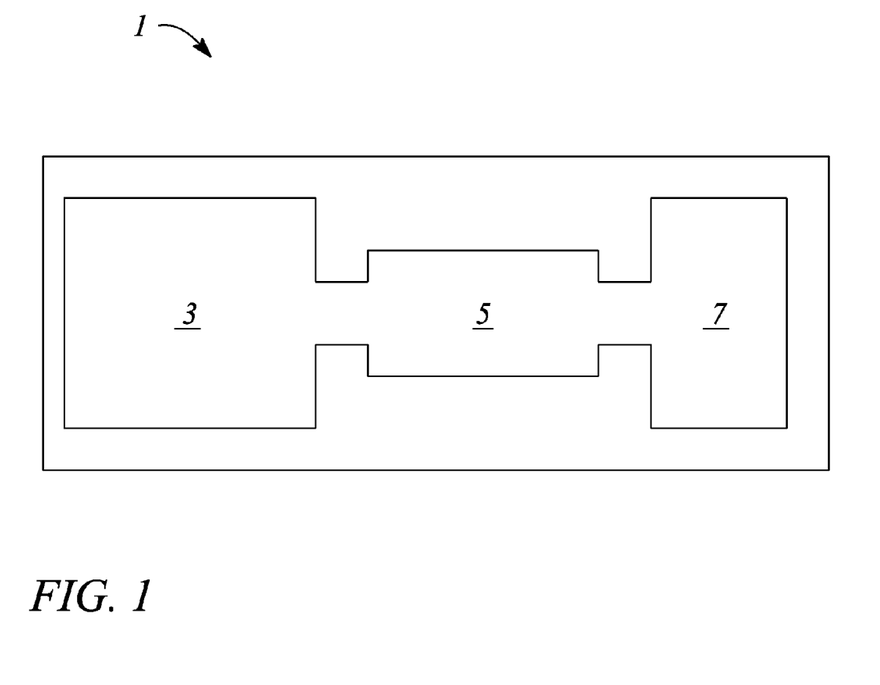
FIG. 1 shows a general block diagram of a mass spectrometer.

FIG. 1 shows a general block diagram of a mass spectrometry system. The block diagram is not to scale and is drawn in a general format because the present invention may be employed with a variety of different type of mass spectrometers. The mass spectrometry system 1 of the present invention comprises an ion source 3, an ion transport system 5, and an ion detector 7. The ion detector 7 is positioned downstream from the ion transport system 5.

The ion source 3 provided by the present invention may comprise a variety of different ion sources known in the art. For instance, a typical ion source 3 may comprise a matrix assisted laser desorption ionization source (MALDI), or atmospheric pressure matrix assisted laser desorption ionization source (AP-MALDI). In particular the invention is useful with an ion source that provides a laser or light source. Other potential sources may comprise electron ionization (EI), chemical ionization (CI), atmospheric pressure photo ionization (APPI), atmospheric pressure chemical ionization (APCI) and combinations of these devices. The invention may comprise or utilize any ion sources known or not known yet in the art which comprise a laser or the production of an ion plume, or perform a particular surface ionization or production of ion plume from a surface. The invention has potential application with multimode ionization sources that may use various combinations of ion sources. The ion source 3 may be positioned in a variety of positions and locations within the mass spectrometry system 1.

Figure 2:
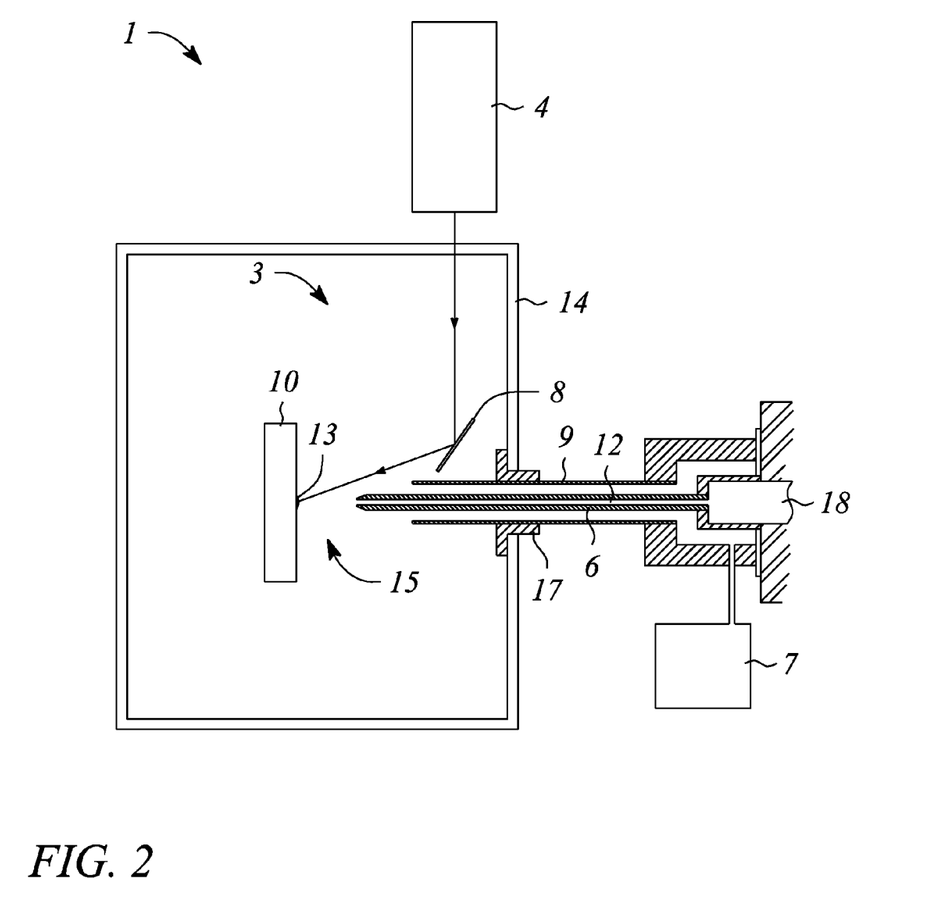
FIG. 2 shows a first embodiment of the present invention.

The ion transport system 5 is adjacent to the ion source 3 and may comprise a variety of devices known in the art (See FIG. 2). For instance, the ion transport system 5 may comprise a collecting capillary 6 or any ion optics, conduits or devices that may transport ions and that are well known in the art. Other devices that move ions from one position to another may be employed. These devices may or may not be under vacuum.

The ion detector 7 may comprise a variety of different types of detectors known in the art. The detector 7 may comprise a portion of the transport system 5 or may comprise an independent device. The ion detector 7 is design to detect the presence, quantity and type of ions produced by the mass spectrometry system 1.

FIG. 2 shows a cross-sectional view of a first embodiment of the invention. The figure shows the present invention applied to an AP-MALDI mass spectrometry system. For simplicity the figure shows the invention combined with a source housing 14. The use of the source housing 14 to enclose the ion source 3 and system is optional. Certain parts, components and systems may or may not be under vacuum. These techniques and structures are well known in the art.

The typical ion source 3 may comprise a laser 4, and a target support 10. A target 13 is applied to the target support 10. The target 13 may or may not be in a matrix material. The laser 4 provides a laser beam toward the target 13. The laser beam is directed from the laser 4 toward the target support 10 and target 13. An optional reflector 8 may be employed. The target 13 is then ionized and the analyte ions are released as an ion plume into the ionization region 15.

The ionization region 15 is located between the ion source 3 and the collecting capillary 6. The ionization region 15 comprises the space and area located in the area between the ion source 3 and the collecting capillary 6. Collecting capillary 6 may be enclosed by an optional gas conduit 9. An inert gas may be supplied to the ionization region 15 by gas conduit 9. The gas may be supplied by gas source 7. The ionization region 15 contains the ions produced by ionizing the sample that are vaporized into the gas phase. This region can be adjusted in size and shape depending upon how the ion source 3 is arranged relative to the collecting capillary 6. Most importantly, located in this region are the analyte ions produced by ionization of the target 13.

The collecting capillary 6 is located downstream from the ion source 3 and may comprise a variety of materials and designs that are well known in the art. The collecting capillary 6 is designed to receive and collect analyte ions produced from the ion source 3 that are discharged as an ion plume into the ionization region 15. The collecting capillary 6 has an elongated bore that receives the analyte ions and transports them to another capillary, or location.

Figure 3:
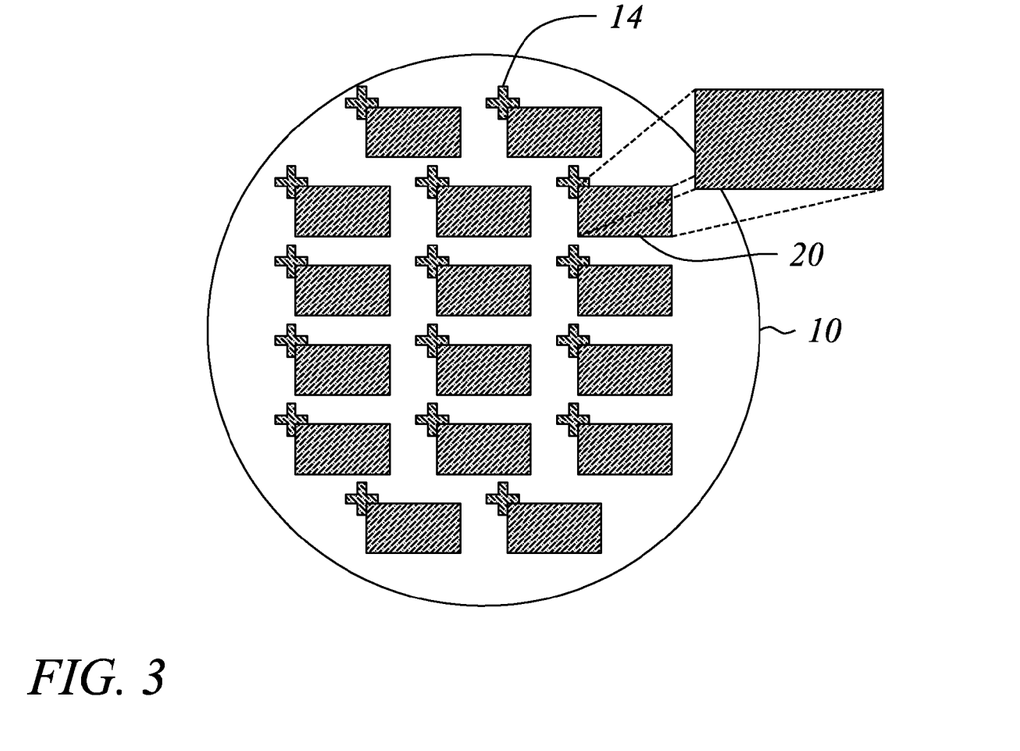
FIG. 3 shows a second embodiment of the present invention.

Important to the invention is target support 10. Target support 10 is designed to hold or maintain a target 13. The target support 10 may comprise or be coated with a carbon nanotube material of the present invention. FIG. 3 shows an embodiment of the present invention. The present invention should not be interpreted to be limited to this embodiment of the invention. The drawing shows the target support 10 comprising a target plate. Target plates may comprise the target support 13 or a portion of it. As discussed above, target support 13 may also independently comprise a single simple surface for ionization.

Carbon nanotubes are extremely hydrophobic and have the capability of absorbing UV energy. These characteristics of carbon nanotubes are essential for the possible matrixless biomolecular detection. The carbon nanotube surface is important to the invention and is attached to or comprises an ionization surface (surface modification). From a functional standpoint this may include covalent attachment or strong vander waals forces. In certain instances the carbon nanotube material may be grown on the surface. However, this is not required. In certain instances the carbon nanotube material may be sprayed on the surface or applied as a coating. The carbon nanotube material creates a surface for improved ionization or production of ion plume. The hydrophobic carbon nanotube surface may be used to make ionization from the target support 10 more efficient. Since after the growth of carbon nanotubes, the surface becomes slightly roughened and provides a very large surface area as a result. This may promote the dispersion of analyte and matrix. There has been a considerable amount of investigation into the use of porous materials as MALDI plates. Carbon nanotubes provide not only a hydrophobic surface but a large surface area with strong absorption at 334 nm.

Typically, carbon nanotubes can grow on a layer of transition metal catalyst pre-deposited on a substrate at optimal temperature and pressure or transition metal catalytic clusters. Carbon nanotubes can also be directly coated on a chemically modified surface. There are a number of techniques for the preparation of carbon nanotubes. For instance, single walled carbon nanotubes have been prepared as discussed by Ericson et al., *Chem. Mater.* 2003, 15, 175-178, 2003; Huang, Z. P., Applied Physics Letters, Volume 82, Number 3, Jan. 20, 2003; Melosh et al., Science, Volume 300, Apr. 4, 2003; Chen, R. J., *J. Am. Chem. Soc.* 2001, 123, 3838-3839; Bradley, K., NanoLetters Vol. 0. No. 0 A-D, Nov. 5, 2003; Lustig, S. R., Nanoletters, Vol. 3, No. 8, 1007-1012, 2003. In other cases, multiple walled carbon nanotubes have also been developed and employed. A number of techniques for preparing these types of nanotubes are also known and disclosed in the literature. Both single wall and multiwall carbon nanotubes can be aligned themselves in a defined direction. Carbon nanotubes largely comprise a ring structure organized in a variety of ways. For instance, they may be ordered at the atomic level as well as to form larger ordered structures and/or supramolecular structures. These various ordered structures are applicable to the present invention and improve over the prior art in providing more efficient ion plume. Other methods and techniques known and developed in the art may be employed. These references are herein incorporated by reference in their entirety.

EXAMPLE 1

Carbon nanotubes can be synthesized and grown by various techniques known in the literature. Some of the well known methodologies include High Pressure CO Conversion (HiPCO), Pulsed-Laser Vaporization (PLV), Arc Discharge and Chemical Vapor Deposition (CVD). The first three methods only produce tangled nanotubes mixed with byproduct. The chemical vaporization technique provides the best methodology to obtain ordered and controlled carbon nanotube density with relatively pure carbon nanotubes. H. Dai, ACC. Chem. Res. 2002, 35, 1035-1044; R. Saito et al, "Physical Properties of Carbon Nanotubes" Imperial College Press.

The chemical vapor method utilizes hydrocarbon gases ($CH_4$, $CO$, $C_6H_6$, $C_2H_5OH$ et al) as a carbon stock and metal catalysts (Fe, Fe/Mo, Co, Co/Mo, Ni et al) as a "seed" to grow carbon nanotubes at 500° C.~1200° C. To get a desired carbon nanotube density and to grow carbon nanotubes on predefined locations, one must control the distribution, density and location of seeds. Seeds can be controlled logically by the polymer carrier approaches.

In these approaches, a polymer is employed as a binder to disperse a catalyst uniformly across the wafer by a spin coating method. Catalysts can be either attached or otherwise complexed to the repeat unit of one segment of a polymer or one of the homopolymer constituents. The molecular dispersion of the catalyst species insures the uniform distribution of catalyst across the wafer. The size of catalyst cluster, seed, after polymer removal is mainly determined by the catalyst containing chain length. The spacing between catalyst clusters is determined by either the dilution factor, the volume ratio of polymer segments or by conventional lithography technique. The distance between catalyst islands is determined by E-beam or optical lithography. Through this approach, the population of carbon nanotubes can be controlled precisely and also the carbon nanotube size.

Figure 4:
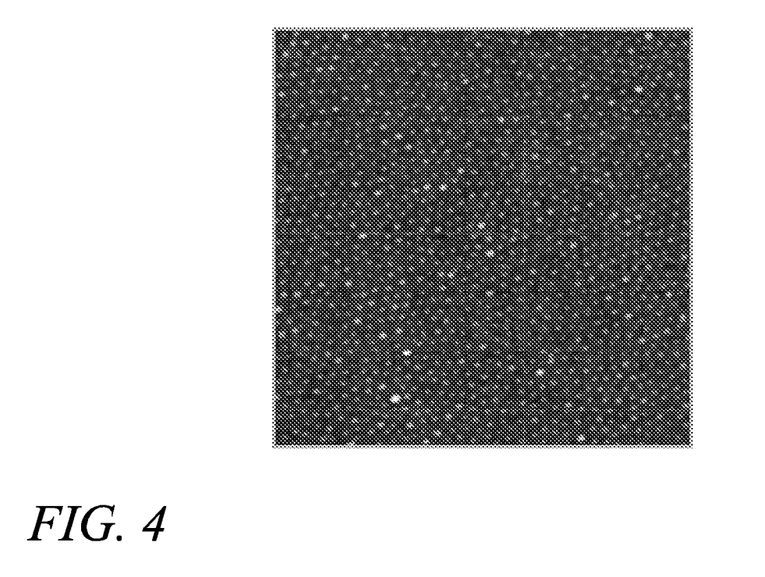
FIG. 4 shows an AFM image of a first method for growing carbon nanotubes.
Figure 5:
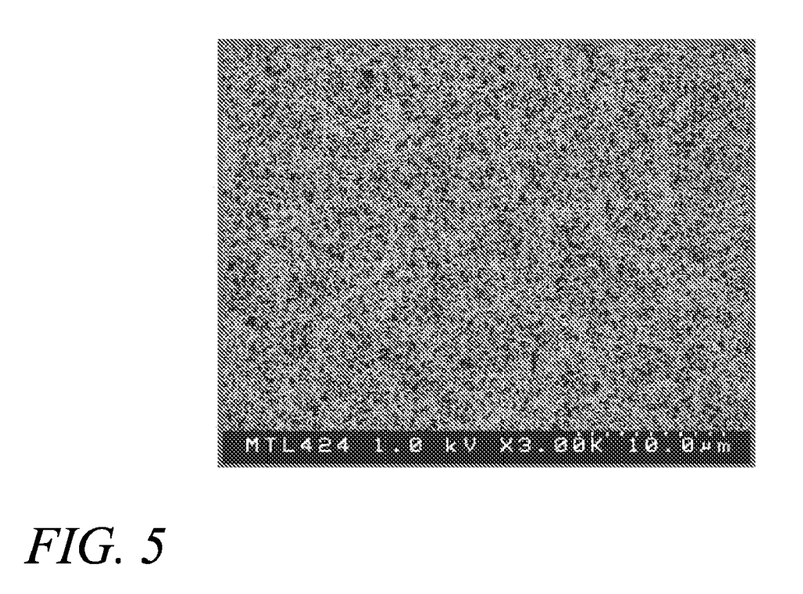
FIG. 5 shows an SEM image of carbon nanotubes grown using this first methodology.

FIGS. 4 and 5 show photographs taken of carbon nanotubes grown using the chemical vapor deposition process discussed above. The carbon nanotubes were grown using 0.25 wt % Polystyrene-b-Fe complexed Polyvinylpyridine (PVP) dispersed onto a thermal oxide surface. After thermal annealing at 160° C. for 36 hrs and UV-ozonation to remove organic polymer, 2 nm $Fe_2O_3$ particles were formed with average spacing of 30 nm. The growth of carbon nanotubes using $CH_4$ at 900° C. under atmospheric pressure is shown in FIG. 5. FIG. 5 shows a scanning electron micrograph (SEM) image of the carbon nanotubes on the surface of the PS-Fe complexed PVP. The carbon nanotubes are uniformly distributed over the surface of the wafer they were grown on. They also show predictable density and ordering.

EXAMPLE 2

Figure 6:
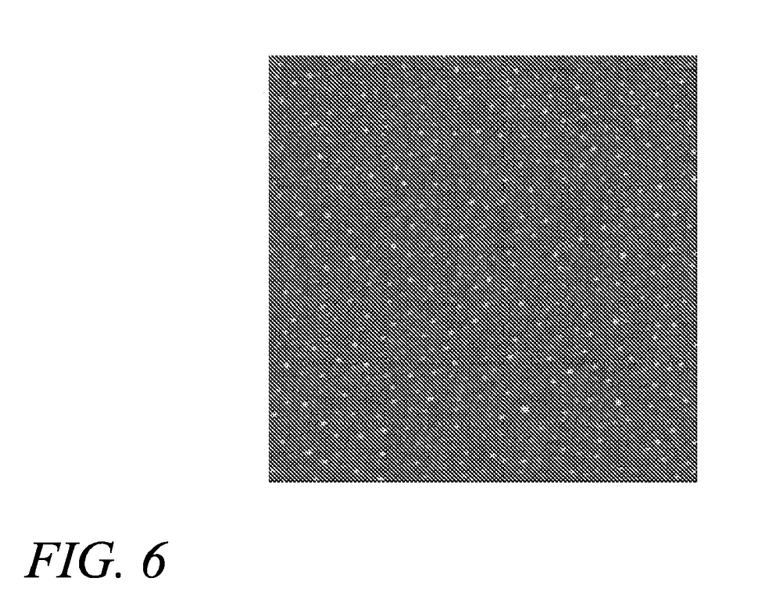
FIG. 6 shows a second AFM image of a second method for growing carbon nanotubes.
Figure 7:
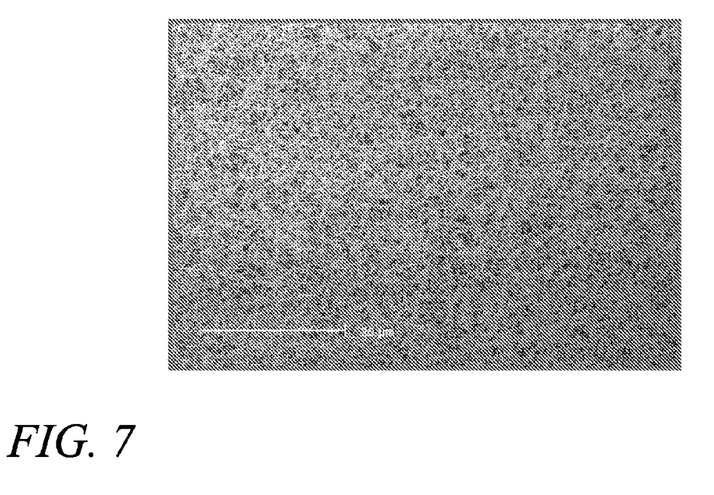
FIG. 7 shows an SEM image of carbon nanotubes grown using the second methodology.

Carbon nanotubes can also be grown using a related dispersion approach. For instance, 0.2 wt % of Fe complexed PMGI was spun onto a thermal oxide surface first followed by annealing at 200° C. for 24 hrs and the removal of the organic component. The resulting uniformly dispersed Fe catalyst is depicted in FIG. 6 and the growth result is displayed in FIG. 7. FIG. 7 shows an SEM image of carbon nanotubes prepared on Fe complexed PMGI. The nanotubes are shown to be evenly distributed over the surface of the wafer.

EXAMPLE 3

Figure 8:
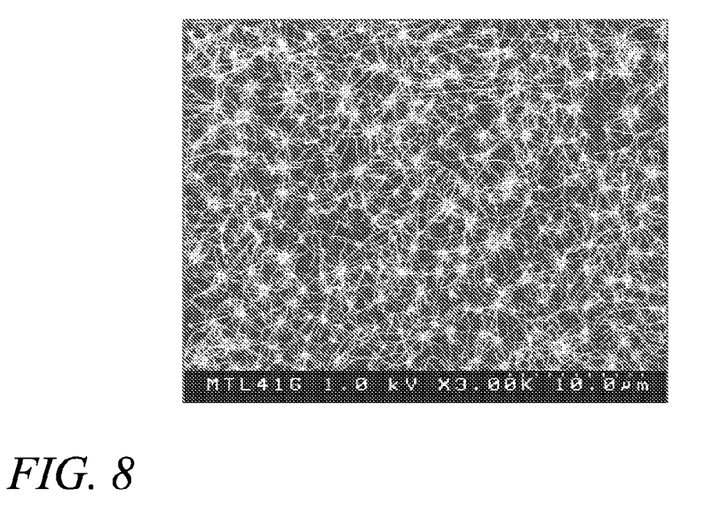
FIG. 8 shows and SEM image of carbon nanotube growth results for PS-b-PFEMS.
Figure 9:
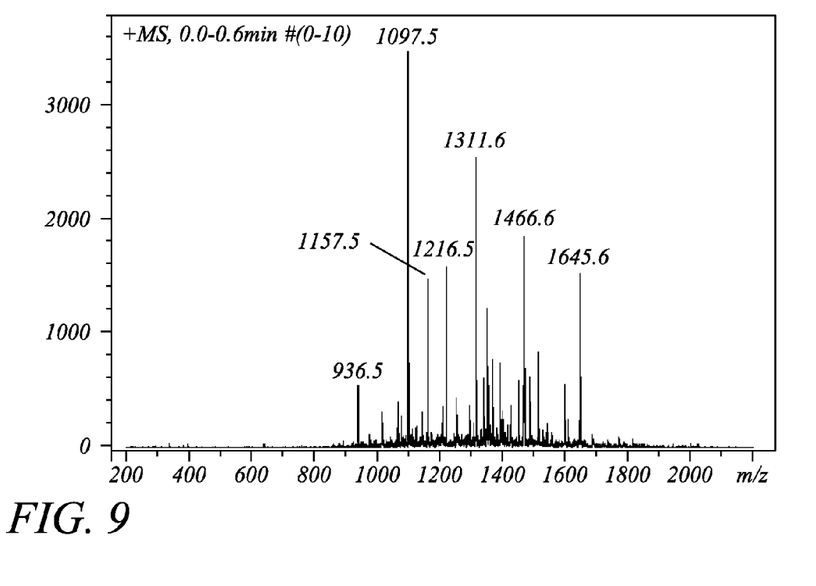
FIG. 9 shows a mass spectrum of analyte on a titanium nitride coated target surface.
Figure 10:
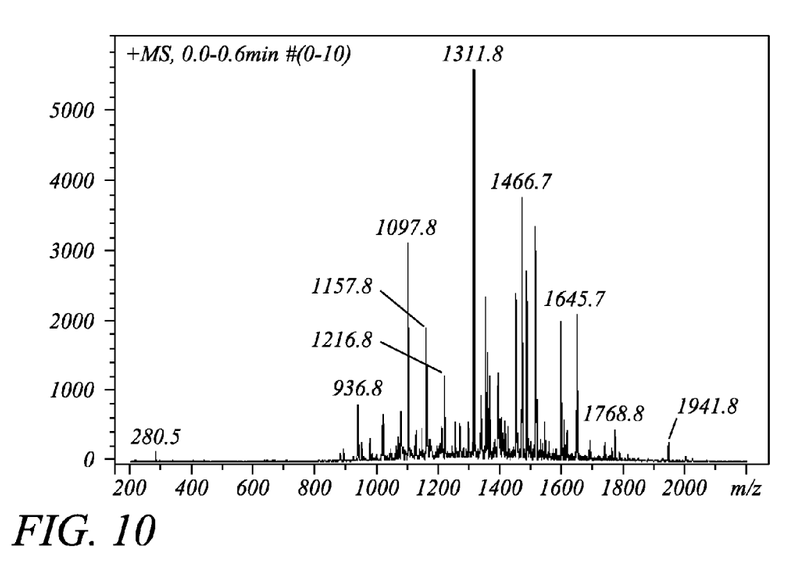
FIG. 10 shows a mass spectrum of the same analyte on a carbon nanotube coated surface.

There are still other dispersion techniques and materials that may be employed for growing carbon nanotubes. 0.25 wt % Polystyrene-b-Poly-(ferrocenyl ethyl methyl silane) was coated on a thermal oxide surface. After calcinations at 700° C., carbon nanotube growth was performed at 900° C. under $CH_4$. An SEM image of ordered carbon nanotubes are shown in FIG. 8.

Each of the above examples 1-3 shows how carbon nanotubes may be grown on a surface. In particular, the density, position and ordering of the materials may be controlled. This is important to the invention. In particular, the above technique may be applied to grow or "seed" carbon nanotubes on a MALDI or AP-MALDI plate. FIGS. 9-14 show the results of carbon nanotubes grown on MALDI or AP-MALDI plates. For a discussion of the results see below.

EXAMPLE 4

Spray Approach

Other approaches may be employed to coat carbon nanotubes. For instance, a second approach comprises preparing the carbon nanotubes first from methods such as Arc discharge or pulsed laser vaporization, followed by purification and mixing with a liquid, and finally spraying the mixture onto a surface. Irregular patches of carbon nanotube blobs or bundles rather than uniformly dispersed carbon nanotubes are formed on the surface. Generally, Unless carbon nanotubes are functionlized, they tend to agglomerate due to poor interaction with the spin-casting solvent. R. Saito et al, "Physical Properties of Carbon Nanotubes" Imperial College Press.

EXAMPLE 5

Surface Coating Approach:

Another technique for preparing a carbon nanotube surface comprises the use of a coating. The carbon nanotubes were suspended in chloroform. The solution was pale black (small deviation from "clear"), indicating homogeneity of the solution. The solution was sonicated right before the deposition to avoid/minimize the aggregation of carbon nanotubes.

Next, the solution was deposited on the desired location on a chemically modified hydrophobic glass substrate. Theoretically, hydrophobic modification aids the attachment of carbon nanotubes on the surface since carbon nanotubes are also hydrophobic. The chloroform was then evaporated rapidly at room temperature, leaving carbon nanotubes on the surface. The process was repeated four times to obtain the desired carbon nanotube density.

EXAMPLE 6

AP-Maldi Measurements on Grown Carbon Nanotube Surface

Carbon nanotubes substrates either through coating or grown by chemical vapor deposition are used as maldi targets. An Agilent AP-MALDI source and instrument (LC/MSD Ion Trap XCT) were used for experiments. Nitrogen laser at 10 Hz with 400 micron fiber coupling was specialized for these experiments. The operating laser power was at ~30 uJ/pulse. Acquisition time of about 30 second was used. Commercial titanium nitrite target (Aglient G1972-60025) was used as a control. Tryptic digest of apotransferrin, BSA and peroxidase was dissolved in 0.5 mg/ml or 0.25 mg/ml of CHCA matrix. 0.5 ul of solution was spotted on the commercial titanium nitrite and on carbon nanotube substrates. The quantity of tryptic digest of apotransferrin was 5 fmole. The quantity of tryptic digest of BSA and peroxidase was 500 attomole. 0.25 mg/ml of CHCA matrix was used for tryptic digest of BSA and peroxidase.

Figure 11:
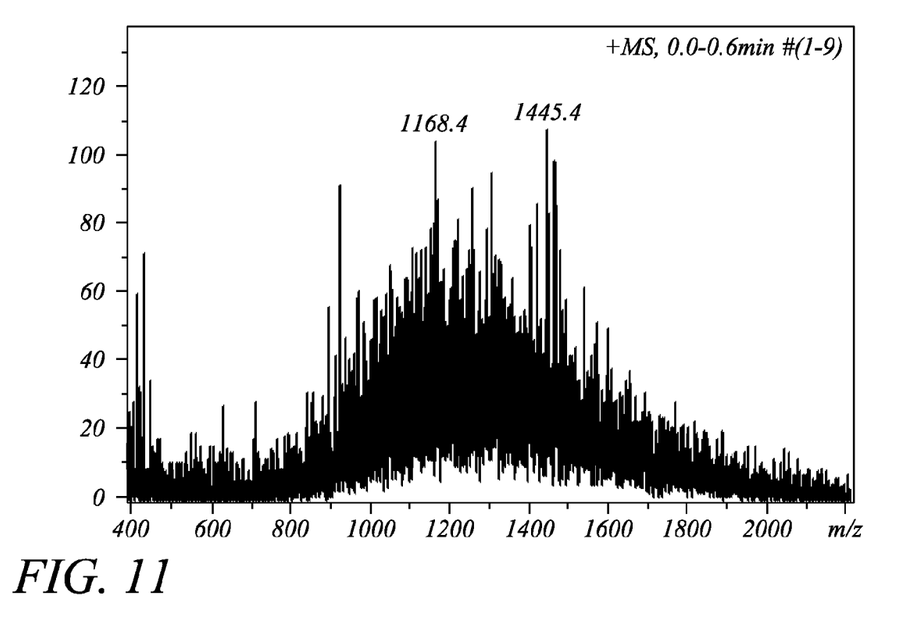
FIG. 11 shows a mass spectrum of 500 attomole BSA digest applied to a titanium nitride surface.
Figure 12:
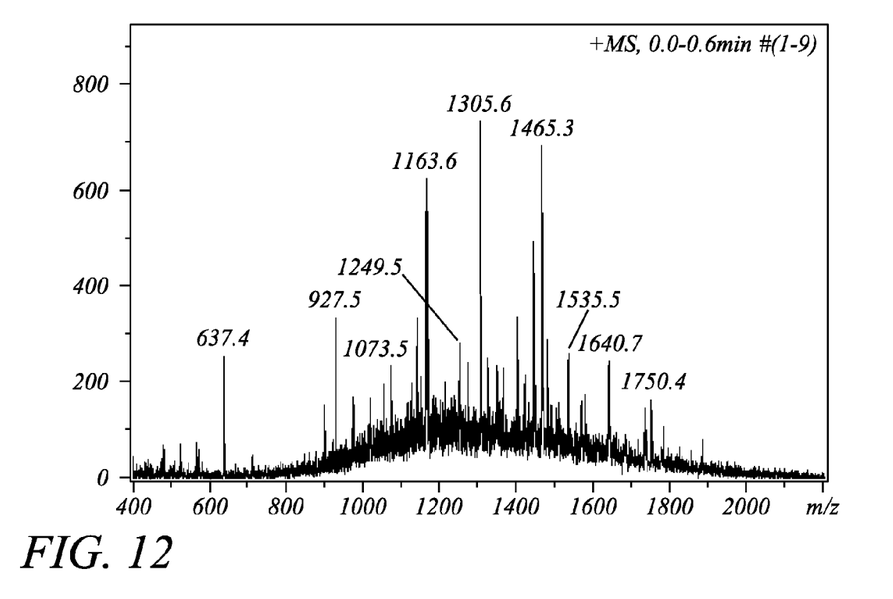
FIG. 12 shows a mass spectrum of the 500 attomole BSA digest applied to a carbon nanotube surface grown using vapor deposition techniques.

FIGS. 9-14 show the mass spectra of various digested proteins ionized using an Agilent Tecnologies, Inc. AP-MALDI source and various plate compositions. In particular, a surface coating of carbon nanotubes was applied to a target substrate. Samples were then digested and applied to the plates and ionized by a laser. Each of the figures shows the results after being run through a mass spectrometer. The figures show various materials used as a surface coating on the plates. For instance, FIG. 11 shows a 500 attomole BSA digest in 0.25 mg/mL matrix on a commercial Titanium nitride surface (Aglient G1972-60025). FIG. 12 shows the same sample material applied to a grown carbon nanotube surface through chemical vapor deposition. In comparing the spectrum it becomes immediately apparent regarding the increase of signal to noise using the carbon nanotube surface. The signal to noise and improved instrument sensitivity is approximately 3 fold.

Other FIGS. show similar results on tryptic digets of apotransferrin and peroxidase applied onto a canbon nanotubes target. In each case a TiN surface was used as a reference surface. Sample was applied to both types of plates for comparison purposes. The mass spectra results show similar results as describe above.

Figure 13:
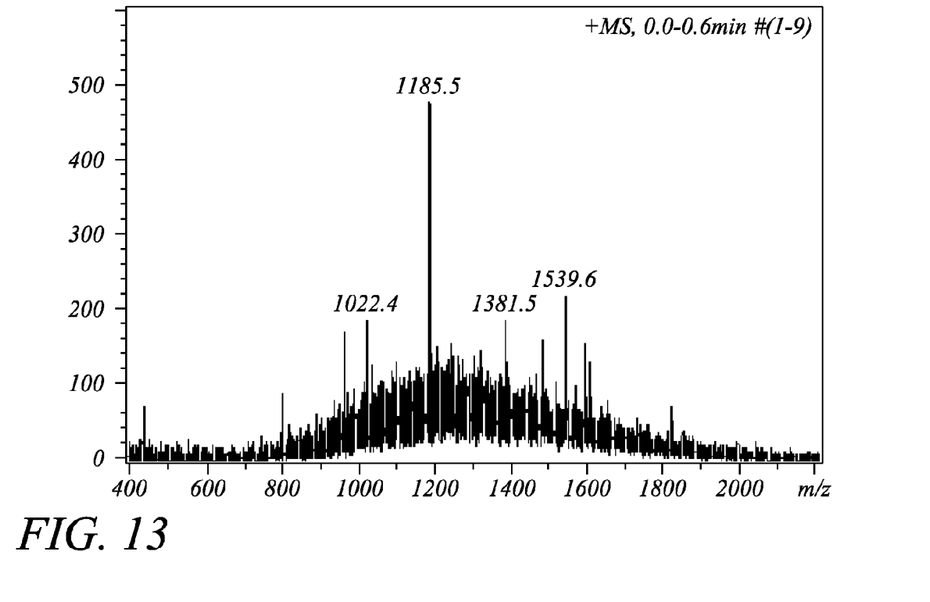
FIG. 13 shows a mass spectrum of 500 attomole peroxidase digest applied to a titanium nitride target substrate.
Figure 14:
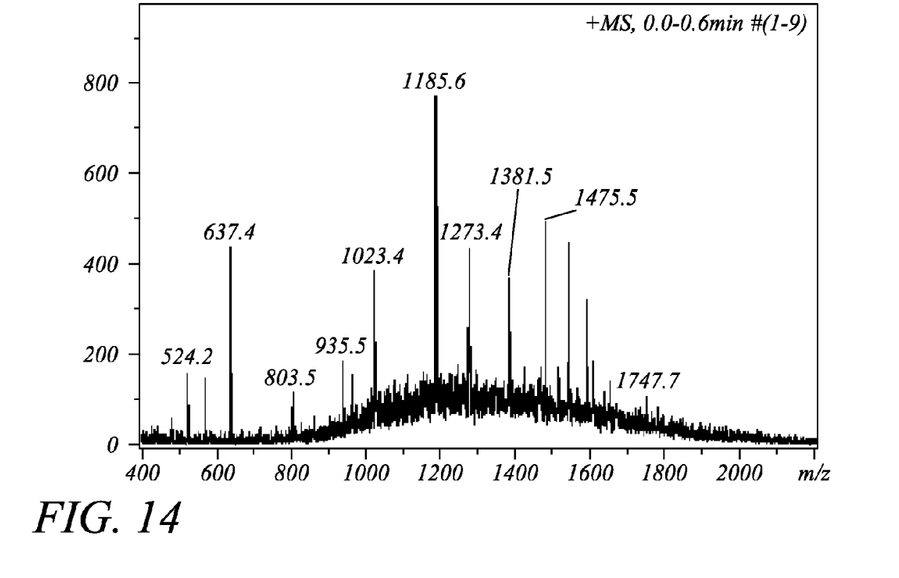
FIG. 14 shows the mass spectrum of the 500 attomole peroxidase digest applied to a carbon nanotube surface grown using vapor deposition technique.

FIGS. 13-14 show similar results for a different protein digest. In this case 500 attomoles of peroxidase digest were applied to a target plate. The mass spectrum shows an improved signal to noise ratio and similar results as described above.

We claim:

1. A mass spectrometer system comprising:
   (a) an ion source for producing ions;
   (b) a surface disposed in the ion source for holding a sample, the surface comprising a uniformly distributed carbon nanotube material;
   (c) a laser for ionizing the sample on the carbon nanotube surface; and
   (d) a detector downstream from the ion source for detecting ions of the sample.

2. A mass spectrometer system as recited in claim 1, wherein the ion source comprises an AP MALDI ion source.

3. A mass spectrometer system as recited in claim 1, wherein the ion source comprises a MALDI source.

4. A mass spectrometer system as recited in claim 1, wherein the carbon nanotube surface comprises a coating or growing in the presence of catalyst.

5. A mass spectrometer system as recited in claim 1, wherein the carbon nanotube surface comprises a portion of a plate used for ionizing the sample.

6. A mass spectrometer system as recited in claim 1, wherein the carbon nanotube surface is hydrophobic.

7. A mass spectrometer system as recited in claim 1, wherein the carbon nanotube surface is structured.

8. A mass spectrometer system as recited in claim 1, wherein the carbon nanotube surface is unstructured.

9. An ion source for use in ionizing a sample, comprising:
   (a) a laser; and
   (b) a surface for holding the sample, the surface comprising a uniformly distributed carbon nanotube material.

10. An ion source as recited in claim 9, wherein the carbon nanotube surface comprises a coating.

11. An ion source as recited in claim 9, wherein the carbon nanotube surface comprising a portion of a plate.

12. An ion source as recited in claim 9, wherein the carbon nanotube surface is hydrophobic.

13. An ion source as recited in claim 9, wherein the carbon nanotube surface is structured.

14. An ion source as recited in claim 9, wherein the carbon nanotube surface is unstructured.

15. A method of making a surface for ionizing a sample in a mass spectrometer ion source, comprising coating a target substrate with a uniformly distributed carbon nanotube material.

16. A method of making a surface for ionizing a sample in a mass spectrometer ion source, comprising constructing a plate comprising a uniformly distributed carbon nanotube material.

17. A method of ionizing a sample in a mass spectrometer system, comprising:
   (a) preparing a surface comprising a uniformly distributed carbon nanotube material;
   (b) placing a sample on the surface comprising the carbon nanotube material; and
   (c) ionizing the sample.

18. A method of ionizing a sample as recited in claim 17, further comprising applying a hydrophilic surface before preparing the carbon nanotube surface.

19. A target substrate for use with a matrix based ion source, having a target substrate surface comprising a uniformly distributed carbon nanotube material that promotes ion formation from an ionizable sample.

20. A target substrate as recited in claim 19, wherein the matrix based ion source comprises a matrix assisted laser desorption ionization (MALDI) source.

21. A target substrate as recited in claim 19, wherein the ion source comprises a fast atom bombardment (FAB) ion source.

22. A target substrate as recited in claim 19, wherein the ion source comprises an atmospheric pressure matrix assisted laser desorption ionization (AP-MALDI) ion source.

23. A target substrate as recited in claim 19, wherein the ion source is at atmospheric pressure.

24. A target substrate as recited in claim 19, wherein the ion source is below atmospheric pressure.

25. A mass spectrometer system, comprising:
   (a) an irradiating source for ionizing a matrix based sample;
   (b) a hydrophobic target substrate adjacent to the irradiating source for supporting the matrix based sample, the hydrophobic target substrate having a target surface comprising a uniformly distributed carbon nanotube material for concentrating the matrix based sample on the target surface before it is desorbed and ionized to form analyte ions;
   (c) a collecting capillary downstream from the irradiating source for receiving the analyte ions produced from the matrix based sample; and
   (d) a detector downstream from the collecting capillary for detecting the analyte ions received from the collecting capillary.

26. A mass spectrometer system as recited in claim 25, wherein the ion source is a matrix assisted laser desorption ionization (MALDI) source.

27. A mass spectrometer system as recited in claim 25, wherein the ion source is a fast atom bombardment (FAB) ion source.

28. A mass spectrometer system as recited in claim 25, wherein the ion source is an atmospheric pressure matrix assisted laser desorption ionization (AP-MALDI).

29. A mass spectrometer system as recited in claim 25, wherein the ion source is at atmospheric pressure.

30. A mass spectrometer system as recited in claim 25, wherein the ion source is below atmospheric pressure.

31. A mass spectrometer system as recited in claim 25, wherein the ion source is above atmospheric pressure.

32. The mass spectrometer system of claim 25, wherein the volume of the ionization region is from 1-5 mm$^3$.

33. A method for producing and detecting analyte ions in a mass spectrometer system, comprising:
   (a) applying a uniformly distributed carbon nanotube material to a target substrate surface for concentrating a matrix based sample; and
   (b) ionizing the matrix based sample to produce analyte ions; and
   (c) detecting the analyte ions.

34. The method of claim 33, further comprising collecting the analyte ions in a collecting capillary before the analyte ions are detected.

35. An apparatus that produces analyte ions for detection by a detector, comprising:
   (a) a matrix based ion source having a target substrate comprising a uniformly distributed carbon nanotube material for producing analyte ions;
   (b) an ion transport system adjacent to the matrix based ion source for transporting analyte ions from the matrix based ion source; and (c) an ion detector downstream from the ion transport system for detecting the analyte ions.

36. An apparatus as recited in claim 35, wherein the ion detector comprises a mass analyzer.

37. An apparatus as recited in claim 35, wherein the ion transport system comprises at least one collecting capillary.

38. A mass spectrometer system, comprising:
(a) an ion source having a target substrate with a target substrate surface comprising a uniformly distributed carbon nanotube material for producing analyte ions;
(b) an ion transport system adjacent to the ion source for transporting the analyte ions from the ion source; and
(c) an ion detector downstream from the ion source for detecting the analyte ions.

39. A mass spectrometer as recited in claim 38, wherein the ion detector comprises a mass analyzer.

40. A mass spectrometer as recited in claim 38, wherein the ion transport system comprises a collecting capillary.

41. A mass spectrometer system, comprising:
(a) a matrix based ion source comprising:
  i. an irradiating source for ionizing a matrix and sample to form analyte ions; and
  ii. a target substrate adjacent to the irradiating source for supporting the matrix and sample, the target substrate having a target surface comprising a uniformly distributed carbon nanotube material for concentrating the matrix and sample on the target substrate surface;
(b) a collecting capillary downstream from the irradiating source and the target substrate for receiving the analyte ions; and
(c) a detector downstream from the collecting capillary for detecting the analyte ions received by the collecting capillary.

* * * * *